April 21, 1964 R. D. SMITH 3,129,909
DIVIDED SAFETY EQUIPMENT FOR AIRCRAFT
Filed Nov. 23, 1962 2 Sheets-Sheet 1
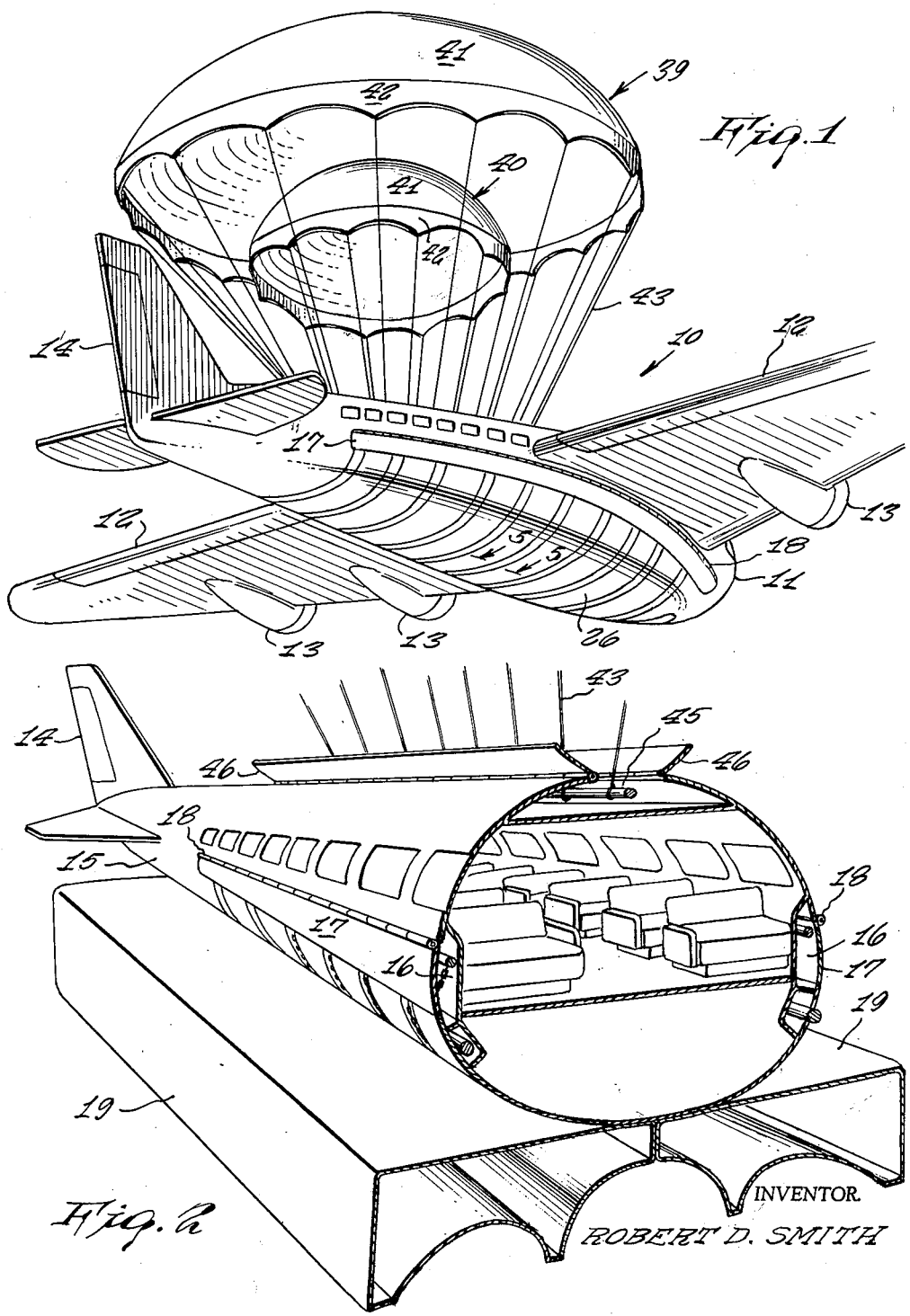
INVENTOR.
ROBERT D. SMITH April 21, 1964  R. D. SMITH  3,129,909
DIVIDED SAFETY EQUIPMENT FOR AIRCRAFT
Filed Nov. 23, 1962  2 Sheets-Sheet 2
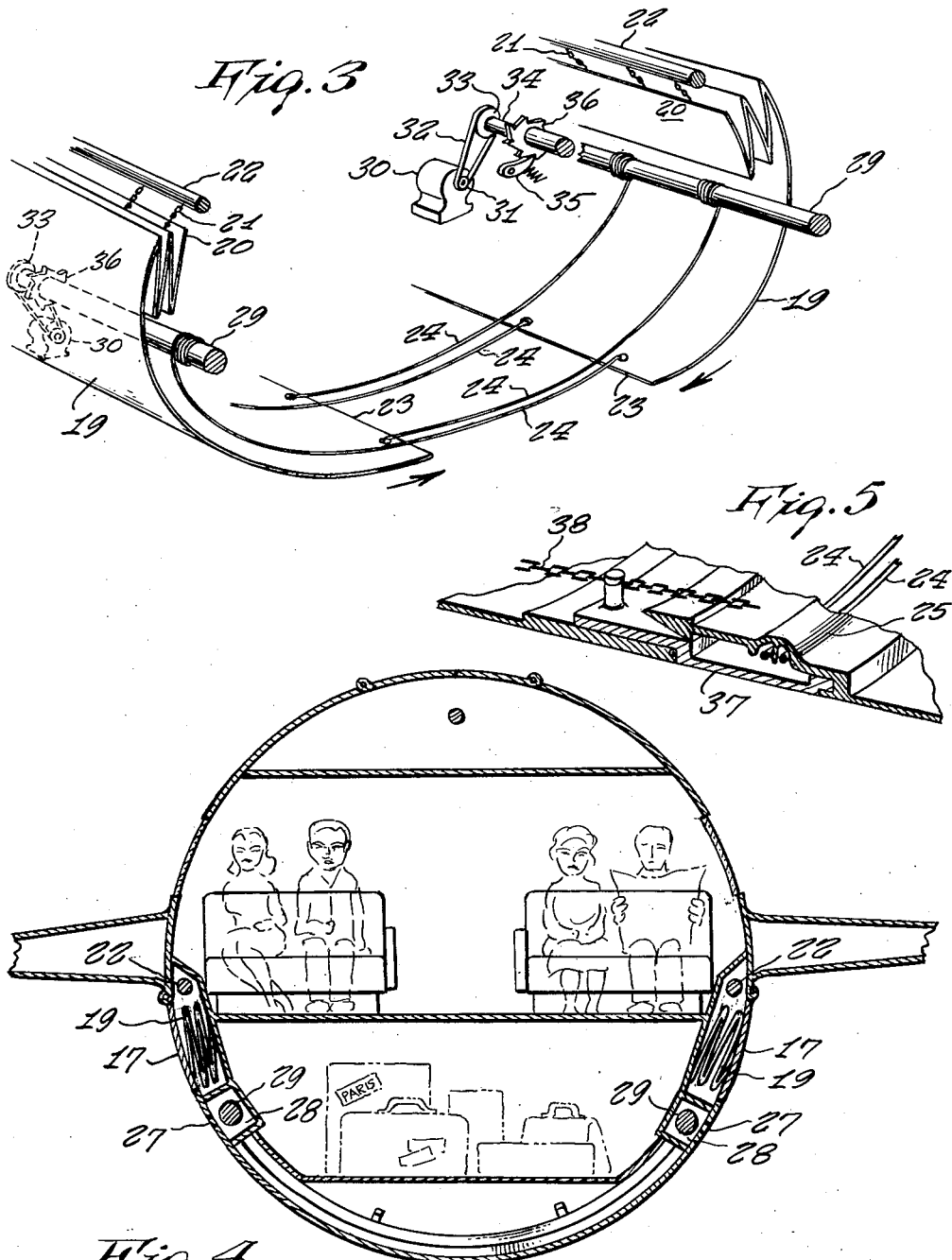
INVENTOR.
ROBERT D. SMITH United States Patent Office 3,129,909
Patented Apr. 21, 1964

3,129,909
DIVIDED SAFETY EQUIPMENT FOR AIRCRAFT
Robert D. Smith, 2742 E. Tremont Ave., Bronx, N.Y.
Filed Nov. 23, 1962, Ser. No. 239,512
2 Claims. (Cl. 244—107)

This invention relates generally to safety apparatus for airplanes. More specifically it relates to aircraft braking devices to prevent sudden fall of aircraft when in a disabled condition; a braking device of such character having been described in U.S. patent application Serial No. 231,139 entitled Safety Equipment for Aircraft of All Types to which the present invention relates.

It is generally well known that considerable numbers of airplanes each year become mechanically disabled during flight, and many of these fall out of control, crashing into the ground or beneath the sea with enormous losses of lives and destruction of costly property. In the above-cited application an apparatus has been shown wherein a singular inflatable air blanket housed within one side of an airplane is withdrawn in time of emergency and passed under the airplane fuselage to the opposite side, the air blanket then being inflated to serve as a cushion on the underside of the fuselage for absorbing shock of landing upon the ground or to serve as a buoyant float for supporting the craft in case of emergency landing upon the sea. Such singular air blanket if made in divided sections would have certain advantages.

Accordingly it is a principal object of the present invention to provide a safety apparatus for airplanes wherein the air blanket is in two divided components and wherein each air blanket component has its own operative mechanism, thus affording a total apparatus which will better balance the craft due to a balanced placement of similar components and operative mechanisms therewithin.

Another object of the present invention is to provide a safety apparatus for airplanes wherein the air blanket components and mechanisms are located on each opposite longitudinal side of the airplane and wherein each air blanket component, in operative use, extends from one of the longitudinal sides, passing on the under side of the fuselage and terminating at the longitudinal center of the bottom, along which the leading edges of both air blanket components abut each other.

Still another object of the present invention is to provide a safety apparatus for airplanes which can accordingly be placed into operative position in one-half the time of an apparatus employing a singular air blanket retained along one side only of the airplane.

A still further object of the present invention is to provide a safety apparatus for airplanes that can be operated from a single control, which is foolproof, and which will not in any way disrupt the streamlined contour of the fuselage when in an inoperative use.

Other objects of the invention are to provide an aircraft safety apparatus which is of relatively simple design, has a rugged construction and is easy to operate.

These and other objects will be readily apparent upon a study of the following specification and the accompanying drawings wherein:

FIGURE 1 is a bottom perspective view of an aircraft incorporating the present invention, FIGURE 2 is a transverse cross sectional view thereof showing the invention in operative use, FIGURE 3 is a fragmentary perspective diagram showing the principal parts comprising the invention, FIGURE 4 is a cross sectional view through 4—4 of FIGURE 1, and FIGURE 5 is a transverse cross sectional view of an airplane showing the invention in inoperative use.

Referring now to the drawing in detail the numeral 10 represents an airplane according to the present invention wherein there is a fuselage 11, wings 12, engines 13 and rudder 14.

On each side 15 of the fuselage there is a compartment 16 having an access door 17 on its outer side supported on hinges 18. Within each compartment an inflatable air blanket component 19 is stored in folded condition as shown in FIGURES 2, 3 and 4. One portion 20 of the air blanket is fixedly secured to a chain 21 attached to a rigid bar 22 within the compartment. A leading edge 23 of each air blanket is secured to cords 24 which extend under the lower edge of doors 17, the cords extending within transverse grooves 25 on the underside 26 of the fuselage, the cords then passing through small openings 27 on the opposite side of the fuselage and into a compartment 28 wherein the terminal ends of the cords are wound up on a drum 29 which can be rotated by activating an electrical motor 30. A pulley 31 on the motor shaft is connected by means of a belt 32 to pulley 33 located on the drum shaft 34. A pawl 35 and ratchet wheel 36 will prevent unwinding of the cord after the motor is stopped.

It is to be noted that one cord from each opposite air blanket component passes through each of the transverse grooves. (See FIGURES 3 and 4.)

In order to not disrupt the streamlined contour of the fuselage underside by a plurality of transverse cords, a transverse door 37 covers each groove when the safety equipment is not in use. The doors may be slidably opened by drawing chains 38 to which each door is secured, the door being slid within the fuselage as described in greater detail in another U.S. Patent 3,100,096 relating to U.S. patent application Serial No. 231,139. Thus the cords are exposed for operative use.

In operative use, the doors 37 are opened by sliding within the fuselage when pulled by chains 38. Then the motors 30 are started causing each air blanket component to be drawn out of compartment 16, door 17 being opened. The air blanket components are drawn out on the underside of the fuselage until the leading edges of each abut one another, each component then being inflated as shown in FIGURE 2, by means of air compressors (not shown).

Each air blanket component is comprised of an upper panel, a lower panel, opposite side and end panels, the lower panel having an upwardly extending pocket on its underside.

An auxiliary feature of this airplane includes a pair of parachutes 39 and 40 which may be released at moment of emergency, causing the airplane to descend at slow rate of speed, and maintaining it at level comfortable position. The parachutes are in concentric axial alignment with each other, each parachute having a canopy 41 fringed with a vertically depending skirt 42 from which shrouds 43 connect to a bar 44 within compartment 45 having overhead access doors 46. One parachute envelops the other.

In operative use, doors 46 are sprung open causing each parachute to successively open out.

Thus there has been shown a safety apparatus wherein air blanket components may be drawn down on opposite undersides of a fuselage.

While various changes may be made in the detail construction, it is understood that such changes shall be within the spirit and scope of the present invention as defined by the appended claims.

What I claim as new and desire to secure by Letters Patent of the United States is:

1. In an airplane, the combination with a fuselage, a safety apparatus comprising a pair of inflatable foldable air blanket components, means for storage of each one of said air blanket components on each one longitudinal side of said fuselage and means for drawing each of said air blanket components down on opposite undersides of said fuselage, said storage means comprising a longitudinal compartment on each side of said fuselage, a hinged access door to each of said compartments, and a rotatable drum on each opposite side of said fuselage, a plurality of transverse grooves on the underside of said fuselage, a pair of cords extending through each of said grooves, one of said cords operative with one of said air blanket components and the other of said cords operative with the other of said air blanket components, one end of each of said cords connected to a leading edge of one of said air blanket components and the other end of each of said cords connected to one of said drums, said cords in operative use moving in opposite directions through each one of said grooves.

2. In an airplane, the combination as set forth in claim 1 wherein each said air blanket component comprises an upper panel, a lower panel in spaced apart relation and side and end panels between said upper and lower panels, said lower panel having an upwardly extending pocket on its underside.

References Cited in the file of this patent

UNITED STATES PATENTS

| | | |
|---|---|---|
| 2,455,044 | Caplan | Nov. 30, 1948 |
| 2,711,868 | Parker et al. | June 28, 1955 |
| 2,940,700 | Trannoy | June 14, 1960 |
| 3,051,420 | Novak | Aug. 28, 1962 |